United States Patent [19]

Simpson

[11] 3,943,655

[45] Mar. 16, 1976

[54] RACK FOR STOWING LEADERS

[76] Inventor: Lee S. Simpson, P.O. Box 879, Castroville, Calif. 95012

[22] Filed: Dec. 4, 1974

[21] Appl. No.: 529,359

[52] U.S. Cl. ............................................. 43/57.5 R
[51] Int. Cl.² ....................................... A01K 97/06
[58] Field of Search ........ 43/57.5 R, 57.5 A, 54.5 R

[56] References Cited
UNITED STATES PATENTS

| | | | |
|---|---|---|---|
| 1,011,081 | 12/1911 | Reely | 43/57.5 R |
| 2,804,717 | 9/1957 | Ripperdan | 43/57.5 A |
| 2,866,295 | 12/1958 | Shanks | 43/57.5 R |
| 3,032,914 | 5/1962 | Valle | 43/57.5 R |

Primary Examiner—Louis G. Mancene
Assistant Examiner—Daniel J. Leach
Attorney, Agent, or Firm—Huebner & Worrel

[57] ABSTRACT

A rack for stowing leaders of the type employed in the fishing industry which is characterized by a stanchion and a first retainer rigidly affixed to the stanchion and having attached thereto a plurality of suspension wires to which the ends of a plurality of leaders are attached. An annular body is disposed beneath said first retainer and is affixed to said stanchion for receiving in circumscribing relation the mid-portion of each of the leaders. A second retainer is rigidly fixed to said stanchion beneath the annular body for receiving the opposite end portions of the leaders.

6 Claims, 7 Drawing Figures

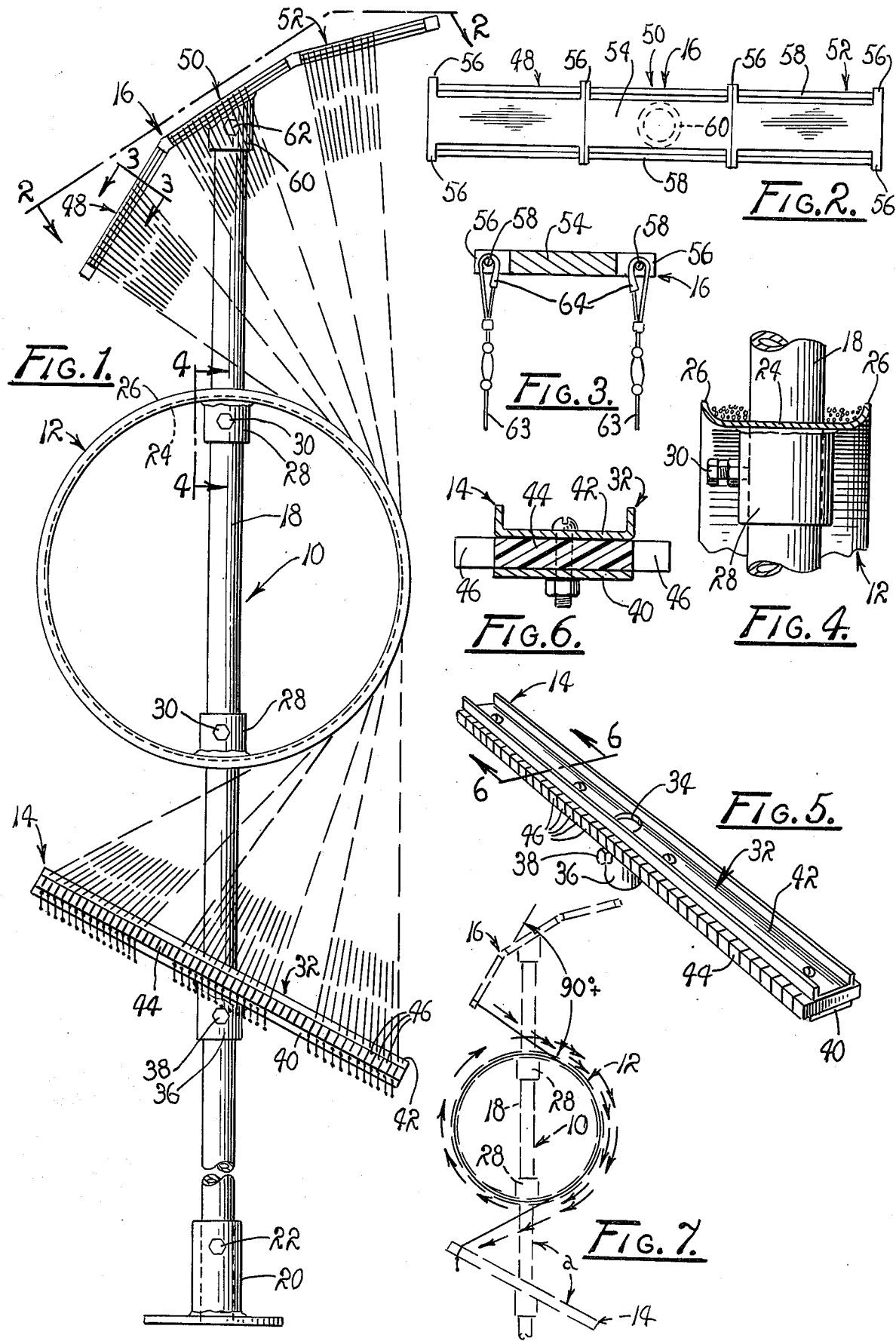

RACK FOR STOWING LEADERS

BACKGROUND OF THE INVENTION

The invention generally relates to a rack for stowing leaders of the type employed in the fishing industry, and more particularly to a rack which can readily be mounted aboard a fishing vessel and employed in rapidly stowing leaders, as fishing lines are retrieved, and from which leaders can rapidly be broken-out and deployed during fishing operations.

In the fishing industry, it is common practice to deploy or pay-out fishing lines having a plurality of leaders attached thereto in predetermined spaced relation. Of course, each leader normally is made up by hand and includes a fastener, often referred to as a snap, secured to one end of the leader and a lure secured to the opposite end thereof. As the fishing lines are paid-out during trolling operations, the leaders are serially fastened to the fishing lines. These operations must be rapidly performed.

Similarly, as the fishing lines are retrieved or taken-in, each of the leaders must be detached from the fishing lines and rapidly stowed.

Further, for reasons fully understood by those familiar with the fishing industry, it is desirable that the leaders be washed-down and stowed upon retrieval. Currently, it is common practice, upon retrieval, to coil the leaders into small coils and deposit them in pails containing fresh water. Of course, a great deal of time is lost in coiling the leaders. This loss of time should be avoided, where possible, in the interest of economy and efficiency. In a similar manner, a great deal of time may be lost in breaking-out the leaders, particularly in the event a fouling of the leaders is encountered, due to the tendency of leader material to retain its coiled configuration.

It is, therefore, the general purpose of the instant invention to provide a practical rack for use in stowing leaders of the type employed in the fishing industry, which can readily be mounted aboard a fishing vessel and easily employed for facilitating expeditious deployment and retrieval of fishing lines during the performance of fishing operations such as trolling and the like.

OBJECTS AND SUMMARY OF THE INVENTION

It is, therefore, an object of the instant invention to provide a rack for stowing leaders of the aforementioned type which overcomes the aforementioned difficulties and disadvantages.

It is another object to provide a rack for use in making up, pre-baiting and stowing leaders through the use of which efficiency in fishing operations is enhanced.

It is another object to provide a rack for stowing leaders through the use of which leaders can be rapidly stowed and broken-out.

It is another object to provide a rack for stowing leaders through the use of which leaders can rapidly be removed from and attached to fishing lines during the performance of fishing operations.

It is another object to provide a rack adapted to be mounted aboard a fishing vessel and employed in stowing leaders having mid-portions thereof looped about an annular body and the opposite ends thereof releasably secured in spaced relation with the annular body, whereby the leaders can be rapidly stowed, washed-down and expeditiously broken-out and attached to fishing lines as they are paid-out.

These and other objects and advantages are achieved through the use of a rack for stowing leaders which includes a stanchion adapted to be mounted aboard a fishing vessel, a first retainer rigidly affixed to the stanchion and having suspended therefrom a plurality of tensioned hanger wires arranged in parallelism, each being adapted to support in suspension the end portions of a selected plurality of leaders, an annular body rigidly affixed to the stanchion beneath said first retainer for supporting the mid-portion of each leader in a circumscribing relationship therewith, and a second retainer rigidly fixed to the stanchion beneath the annular body, including a multiplicity of resilient fingers for receiving therebetween the opposite end portions of the leaders for thus securing the leaders in a stowed configuration from which they can readily be broken-out, as will become more readily apparent by reference to the following description and claims in light of the accompanying drawings.

BRIEF DESCRIPTION OF THE DRAWING

FIG. 1 comprises a side elevation of a rack embodying the principles of the instant invention.

FIG. 2 is a top plan view of the rack shown in FIG. 1.

FIG. 3 is a cross-sectional view taken generally along line 3—3 of FIG. 1 taken generally along line 2—2 of FIG. 1.

FIG. 4 is a fragmented, sectional view taken generally along line 4—4 of FIG. 1.

FIG. 5 is a perspective view of a retainer provided for the rack illustrated in FIG. 1.

FIG. 6 is a sectioned view taken generally along line 6—6 of FIG. 5.

FIG. 7 is a schematic view illustrating a manner in which a leader is stowed in said rack.

DESCRIPTION OF THE PREFERRED EMBODIMENT

Referring now to the drawing, with more particularity, wherein like reference characters designate like or corresponding parts throughout the several views, there is shown in FIG. 1 a rack which embodies the principles of the instant invention.

As shown, the rack includes a vertically oriented stanchion, generally designated 10, upon which is mounted a spool, generally designated 12, and a pair of vertically spaced retainers, generally designated 14 and 16.

The stanchion 10 preferably comprises a rigid tubular body 18 having the lowermost end portion thereof received in a socket 20 adapted to be mounted on a planar surface such as the surface of the deck of a selected fishing vessel. As a practical matter, the socket 20 is of a tubular configuration having an internal diameter slightly greater than the external diameter of the body 18 so that the socket may readily receive the lowermost end portion of the body 18 in telescoping fashion. In practice, a suitable screw-threaded setscrew 22 is provided for securing the body 18 in a seated relationship with the socket 20.

While not shown, it is to be understood that suitable means are provided for securing the uppermost end portion of the body 18 against undesired pivotal motion relative to the socket 20. Since the manner in which the uppermost end portion of the body 18 is secured against motion is deemed a matter of convenience, and may be varied as desired, a description of the means employed in securing the uppermost end portion of the body 18 is omitted in the interest of brevity. However, it is to be understood that the body 18 is so secured, where desired, by lashing it to a boom.

The spool 12 is of an annular configuration and includes a cylindrical mid-portion, designated 24. From each of the opposite ends of the mid-portion there is radially extended end portions 26 which define coaxially aligned flanges for the spool. The mid-portion 24 is provided with a pair of diametrically opposed openings, not designated, through which is extended the body 18, of the stanchion 10.

As shown, a pair of coaxially aligned sleeves 28 is welded to the mid-portion 24 of the spool 12 in coaxial alignment with the openings formed in the mid-portion 24. These sleeves serve to receive the body 18 of the stanchion 10 in sliding engagement. Suitable setscrews 30, similar to the setscrew 22, are extended through the sleeves 28 for releasably securing the spool 12 to the stanchion 10. It should, therefore, be appreciated that the spool 12 can readily be removed, replaced or repositioned simply by releasing the setscrews 30 and sliding the spool 12 along the body 18.

The retainer 14 comprises an elongated body 32 having formed near the center thereof an opening 34 suitably dimensioned for slidably receiving the body 18 of the stanchion 10. As shown, a sleeve 36 is secured to the body 32 in coaxial alignment with the opening 30 while a setscrew 38 is extended through the sleeve to be employed for securing the retainer 14 to the stanchion 10.

The retainer 14 is of a bar-shaped configuration having a longitudinal axis of symmetry obliquely related to the longitudinal axis of symmetry for the body 18. As a practical matter, the retainer 14 includes a rigid base plate 40, to which the sleeve 36 is attached. The retainer further includes a rigid cover plate 42, preferably formed form channel stock and is seated on a receiver 44 interposed between the plates 40 and 42. The receiver 44 is formed from a resilient stock material, such as rubber and the like, and includes a plurality of laterally projected fingers 46 defined by slots, not designated, extended in an orthogonal relationship with the longitudinal axis of symmetry of the retainer.

The retainer 16 also is of a bar-shaped configuration. However, the retainer includes angularly related segments 48, 50 and 52. As a practical matter, the retainer 16 includes an elongated center body 54 formed of a suitable metallic material. The body 54 is so deformed that each of the segments 48, 50 and 52 are angularly related with respect to the others. The segments are abutted at zones of juncture and, where desired, are welded together. From the opposite sides of the zones of juncture for the segments 48, 50 and 52, as well as at the extended ends of the segments 48 and 52, there is provided a laterally projected hanger 56. The end portions of the hangers 56 are provided with suitable openings, not designated, through which there is threaded a suspension wire 58. Each of the suspension wires 58 of the pair thus provided is suitably tensioned and secured in place.

The retainer 16 is affixed to the stanchion 10 in any suitable manner. However, as shown, a socket 60 is affixed to the center body 54, as by welding or the like, and extended obliquely from the plane of segment 50. This socket is adapted to be received by the uppermost end portion of the body 18 of the stanchion 10. The socket 60 is similar in construction to the socket 20 and includes a setscrew 62, similar to the setscrews 22 and 30, which serves to secure the retainer 16 to the body 18 of the stanchion 10.

It is important here to appreciate that the rack of the instant invention is to be employed in stowing leaders, designated 63, FIG. 3. Such leaders normally are provided with fasteners 64, adapted to be manipulated and thus fastened with a clipping action to the suspension wires 58 for attaching the leaders 63 to the retainer 16. Thus, each of the leaders 63 is, in turn, connected to the wires 58 to be supported thereby in suspension. In order to stow the leaders 63, each is trained in a single pass about the spool 12 with the lowermost end thereof being inserted between a selected pair of fingers 46 of the retainer 14.

Each of the segments 48, 50 and 52 is so angularly related with respective successive tangents to the surface of the spool 12 that the longitudinal axis of symmetry for each of the segments defines with the tangents successive, upwardly opening angles slightly greater than 90°. Consequently, each of the fasteners 64 is caused to gravitate downwardly along the suspension wire 58 to which it is fastened, as tension is applied to the leader, until a previously attached fastener is engaged.

It will, of course, be appreciated that, in practice, leaders of a substantially common length are employed in a given fishing operation. Therefore, since the segments 48, 50 and 52 are spaced at given distances from the circumference of the spool 12, it is necessary for the retainer 14 to be canted at a suitable angle with respect to the stanchion 10, that the suspended end portion of each of the leaders can be received between a pair of fingers 46 projected from the retainer 14.

Moreover, it should be apparent that the dimension of the circumference of the spool 12 and the elevation of the retainer 14 can be varied for accommodating leaders of various uniform lengths. In practice, the lengths of the leaders are multiples of the circumference of the spool 12.

With the rack assembled in the manner hereinbefore described, it is readied for use in stowing a plurality of leaders, designated 63. In employing the rack, a first leader 63 is disconnected from a fishing line as the line is retrieved. This leader is then fastened to the lowermost end of one of the suspension wires 58 and trained in a single pass about the spool 12, as indicated by the directional arrows in FIG. 7. The lowermost end of the leader is now inserted into a slot defined between an adjacent pair of fingers 46. In a similar fashion, each of the successive leaders is disconnected from the fishing lines and attached to one of the suspension wires 58. It will be noted, as best illustrated in FIG. 4, that the body 18 of the stanchion 10 passes through the mid-portion 24 of the spool 12 thus separating the spool 12 into distinct leader-receiving portions. Consequently, the leaders attached to a suspension wire located at one side of the retainer 16 are trained about one end of the spool 12 while leaders attached to the suspension wires located at the opposite side of the retainer 16 are trained about the opposite end portion of the spool 12. Of course, the flanges 26 serve to retain the leaders 63 in their stowed configuration.

When stowed on the rack, the leaders may be washed-down for removing residue therefrom.

Of course, once a fishing operation is initiated, the last leader stowed on the rack becomes the first leader to be removed therefrom and attached to a fishing line being paid-out. Thereupon, each successive leader 63 is disconnected from the retainers 14 in a sequence constituting a reverse of the sequence in which the leaders were stowed on the rack.

In view of the foregoing, it should readily be apparent that through the rack which embodies the principles of the instant invention leaders can rapidly and efficiently be stowed and thereafter rapidly broken-out with minimal fouling.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A rack for stowing leaders under tension comprising:
    A. a substantially vertically oriented stanchion;
    B. a first bar-shaped retainer rigidly affixed to said stanchion and having provided at the opposite sides thereof a pair of tensioned suspension wires arranged in parallelism, each being adapted to support in suspension one end portion of a selected plurality of leaders;
    C. means including an annular body rigidly affixed to said stanchion, in vertically spaced relation with said first bar-shaped retainer, for supporting the mid-portion of each leader of said plurality of leaders in a circumscribing relationship therewith; and
    D. a second bar-shaped retainer rigidly affixed to said stanchion in vertically spaced relation with said annular body including means for receiving the opposite end portion of each leader of said plurality of leaders.

2. The rack of claim 1 wherein said first bar-shaped retainer comprises a plurality of angularly related segments, the longitudinal axis of each segment of said plurality being so oriented as to define with a series of imaginary lines tangentially oriented to said body a series of included angles greater than 90°.

3. The rack of claim 2 wherein said means for receiving the opposite end portions of each leader includes a plurality of resilient fingers projected in coplanar, juxtaposition from opposite sides of said second bar-shaped retainer.

4. A rack for stowing leaders for fishing lines comprising:
    A. a vertically oriented stanchion;
    B. first means for supporting the midportions of a selected pluraltiy of leaders in looped configurations comprising an annular body;
    C. second means disposed in spaced relation with said first means for supporting the opposite end portions of the leaders in spaced relation with said annular body including a first retainer for supporting one end portion of each leader, having at least one pair of juxtaposed, resilient protrusions for receiving therebetween an end portion of one leader of said plurality of leaders, and a second retainer disposed in vertically spaced relation with said first retainer for supporting the opposite end portion of each leader, having a tensioned hanger wire angularly related to an imaginary line tangentially related to said annular body; and
    D. means for securing said annular body and each of said retainers to the stanchion in vertically spaced relation.

5. The rack of claim 4 wherein each of the retainers is of an elongated configuration and is disposed in a substantially coplanar relation with said annular body.

6. A rack for stowing leaders for fishing lines comprising:
    A. means including an annular body supported in a substantially vertical plane and adapted to receive about its periphery the midportions of a selected plurality of leaders, each of said leaders being characterized by a fastener affixed to one end thereof; and
    B. means disposed in radially spaced relation with said body including a first and a second retainer adapted to support the opposite end portions of said plurality of leaders in radially spaced relation with the body, said first retainer being characterized by a segmented configuration including a plurality of angularly related segments, each being inclined toward an axis extended substantially vertically through said annular body and having a pluraltiy of tensioned hanger wires supported thereby in spaced parallelism therewith, whereby each hanger wire is inclined with respect to said axis for receiving said fasteners in sliding relation, and said second retainer being characterized by a linear configuration inclined with respect to said axis and having an aligned plurality of resilient protrusions for receiving therebetween the end portions of said leaders opposite said fasteners.

* * * * *

UNITED STATES PATENT AND TRADEMARK OFFICE
CERTIFICATE OF CORRECTION

PATENT NO. : 3,943,655
DATED : March 16, 1976
INVENTOR(S) : Lee S. Simpson

It is certified that error appears in the above–identified patent and that said Letters Patent are hereby corrected as shown below:

In the Abstract, line 2, after "stanchion" insert a comma.

Column 2, line 26, after "1" and before the period insert ---taken generally along line 2-2 of Fig. 1---.

Column 2, lines 28 and 29, delete "taken generally along line 2-2 of Fig. 1---.

Column 3, line 39, delete "form" and insert ---from---.

Signed and Sealed this eighteenth Day of May 1976

[SEAL]

Attest:

RUTH C. MASON
Attesting Officer

C. MARSHALL DANN
Commissioner of Patents and Trademarks